(12) United States Patent  
Sakata et al.

(10) Patent No.: US 12,530,221 B2
(45) Date of Patent: Jan. 20, 2026

(54) OBJECT RECOGNITION DEVICE (71) Applicant: HITACHI ASTEMO, LTD., Hitachinaka (JP)

(72) Inventors: Kosuke Sakata, Hitachinaka (JP); Masayoshi Kuroda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 438 days.

(21) Appl. No.: 18/252,779

(22) PCT Filed: Sep. 28, 2021

(86) PCT No.: PCT/JP2021/035525
§ 371 (c)(1),
(2) Date: May 12, 2023

(87) PCT Pub. No.: WO2022/195929
PCT Pub. Date: Sep. 22, 2022

(65) Prior Publication Data
US 2023/0418659 A1    Dec. 28, 2023

(30) Foreign Application Priority Data

Mar. 17, 2021    (JP) ................................. 2021-043669

(51) Int. Cl.
*G06F 9/48* (2006.01)
(52) U.S. Cl.
CPC .................................. *G06F 9/4831* (2013.01)
(58) Field of Classification Search
None
See application file for complete search history.

(56) References Cited

U.S. PATENT DOCUMENTS 10,964,089 B1 * 3/2021 Graziosi .................. G06T 7/75
11,062,454 B1 * 7/2021 Cohen ..................... G01S 7/417
(Continued)

FOREIGN PATENT DOCUMENTS

| JP | 2016-112724 A | 6/2016 |
| JP | 2017-092899 A | 5/2017 |

(Continued)

OTHER PUBLICATIONS

International Search Report with English Translation and Written Opinion of International Patent Application No. PCT/JP2021/035525 dated Dec. 28, 2021 (9 pages).

(Continued)

*Primary Examiner* — Adam Lee
(74) *Attorney, Agent, or Firm* — Foley & Lardner LLP (57) ABSTRACT

An object recognition device (3) includes: a processor (4) that inputs point cloud sensor data sensed by a sensor (externality recognition sensor (1)) to a software pipeline formed of a plurality of stages and executes object recognition processing; and a memory. The processor (4) has a plurality of processing units (5) that executes processing constituting the object recognition processing allocated to each of stages A to C. The memory has a plurality of task queue regions (task queues A to C) that temporarily stores the output data of each of the stages. In a case where the output data of each of the stages is not valid upon input to the subsequent stage, the processor (4) rejects the output data without storing same in the respective task queue regions.

15 Claims, 9 Drawing Sheets

(56) References Cited

U.S. PATENT DOCUMENTS

| | | | |
|---|---|---|---|
| 11,637,998 B1* | 4/2023 | Pieper | H04N 9/7973 |
| | | | 348/207.99 |
| 11,694,314 B2* | 7/2023 | Lubana | G06V 10/82 |
| | | | 382/103 |
| 11,978,181 B1* | 5/2024 | Pieper | H04N 23/617 |
| 2016/0140689 A1* | 5/2016 | Lux | H04N 19/136 |
| | | | 345/428 |
| 2016/0170688 A1 | 6/2016 | Komano | |
| 2018/0307937 A1 | 10/2018 | Shinozaki | |
| 2018/0365796 A1* | 12/2018 | Nakazono | G06T 1/60 |
| 2018/0367871 A1* | 12/2018 | Zeng | G01S 13/931 |
| 2019/0043202 A1* | 2/2019 | Ikeda | H04N 23/60 |
| 2019/0108639 A1* | 4/2019 | Tchapmi | G06N 3/044 |
| 2020/0043190 A1* | 2/2020 | Tanner | G06T 15/005 |
| 2021/0089040 A1* | 3/2021 | Ebrahimi Afrouzi | |
| | | | G05D 1/0248 |
| 2021/0166372 A1* | 6/2021 | Verschaeve | G06F 9/3885 |
| 2021/0191898 A1* | 6/2021 | Khan | G06F 15/7896 |
| 2022/0091266 A1* | 3/2022 | Sivakumar | G01S 17/89 |
| 2022/0126864 A1* | 4/2022 | Moustafa | B60W 40/09 |
| 2022/0179708 A1 | 6/2022 | Nishigaki et al. | |
| 2023/0100300 A1* | 3/2023 | Curto | B29C 64/386 |
| | | | 345/419 |

FOREIGN PATENT DOCUMENTS

| | | |
|---|---|---|
| JP | 2019-158390 A | 9/2019 |
| JP | 2020-148513 A | 9/2020 |
| JP | 2020-154830 A | 9/2020 |

OTHER PUBLICATIONS

English Translation of International Preliminary Report on Patentability and Written Opinion issued in International Patent Application No. PCT/JP2021/035525 dated Sep. 28, 2023 (6 pages).

* cited by examiner

OBJECT RECOGNITION DEVICE

TECHNICAL FIELD

The present invention relates to an object recognition device.

BACKGROUND ART

A LiDAR sensor is a sensor that measures distance to an object or the like by observing the scattered reflection of laser pulses emitted toward the outside, and is capable of acquiring point cloud data as a set of a very dense, large amount of observation values by discretely emitting a large amount of laser pulses in arbitrary directions in a three-dimensional space.

Conventionally, there is an external recognition device that detects an object such as a vehicle or a pedestrian by using such point cloud data as an input. Because the point cloud data is a set of very dense observation values, the amount of data is large, and thus the external recognition device processing the point cloud data is subjected to a large processing load or a long processing time.

In a case where a high-performance computer is used to handle the large processing load, the manufacturing cost of the external recognition device increases. Furthermore, in a case where a long processing time is allowed, the delay time from the update of the point cloud data to the output of the recognition result becomes long, the recognition speed for sudden changes in the outside world is reduced, and thus there is a drop in the performance of the external recognition device.

As means for solving this problem, for example, PTL 1 discloses a system configured from a plurality of external recognition sensor signal-processing devices, and each external recognition sensor signal-processing device operates in parallel to improve the processing performance of the external recognition sensor information.

CITATION LIST

Patent Literature

PTL 1: JP 2019-158390 A

SUMMARY OF INVENTION

Technical Problem

The technology disclosed in PTL 1 is configured to process the signals of the respective external recognition sensors by using an external recognition sensor signal-processing device prepared for each of the plurality of external recognition sensors, thereby improving the processing performance per unit time as a whole and shortening the processing time, but does not perform distributed processing on a large amount of data emitted from a single sensor such as a LiDAR sensor.

In a case where there are a large number of input signals from a single sensor, in order to reduce the processing load on the processing device or shorten the processing time, it is necessary to distribute the input signal units, the processing units applied to the input signals, or the execution timing of the processing, and to implement measures to reduce the processing amount itself, and the like; however, the above-described invention does not take into account such measures.

The present invention was conceived of in order to solve the foregoing problems, and an object of the present invention is to provide an object recognition device capable of reducing a processing load in object recognition processing in which point cloud sensor data is used as an input.

Solution to Problem

In order to achieve the above object, an object recognition device according to the present invention includes: a processor that inputs point cloud sensor data sensed by a sensor to a software pipeline formed of a plurality of stages and executes object recognition processing; and a memory, wherein the processor has a plurality of processing units that executes processing constituting the object recognition processing allocated to each of the stages, the memory includes a plurality of task queue regions that temporarily stores output data of each of the stages, and in a case where the output data of each of the stages is not valid upon input to the subsequent stage, the processor rejects the output data without storing same in the respective task queue regions.

Advantageous Effects of Invention

According to the present invention, it is possible to reduce the processing load in object recognition processing in which point cloud sensor data is used as an input. Problems, configurations, advantageous effects, and the like other than those described above will be clarified by the following description of the embodiments.

DESCRIPTION OF EMBODIMENTS

Hereinafter, a configuration and an operation of an object recognition device (point cloud data processing device) according to first to third embodiments will be described with reference to the drawings. The object recognition device is a processing device that is mounted in a moving body such as a vehicle and that detects objects by using sets of observation points obtained as a result of observation by an external recognition sensor such as a LiDAR sensor.

First Embodiment

Hereinafter, an example of an embodiment of the present invention will be described with reference to the accompanying drawings. In addition, the correspondence between the language of the description and the processing indicated by the attached flowchart is indicated by also writing symbols (S1, S2, . . . ) added in the flowchart.

Figure 1:
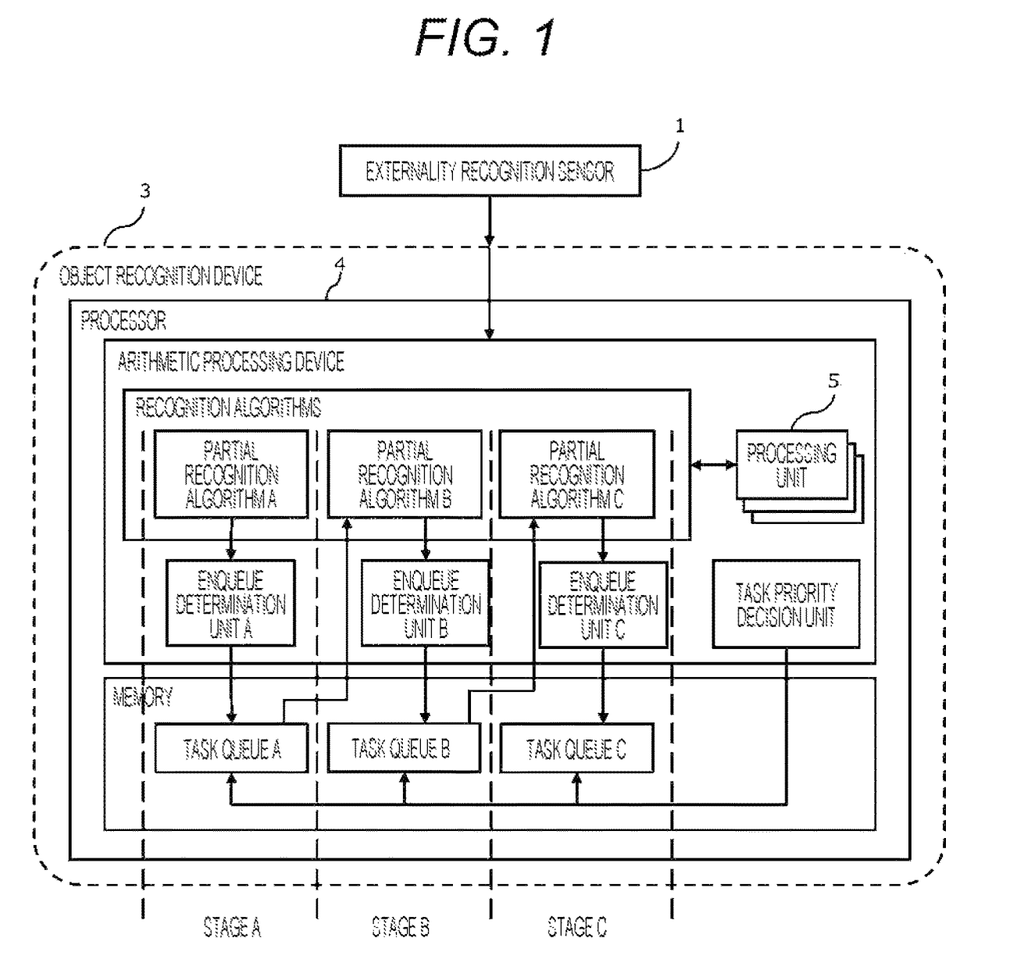
FIG. 1 is a block diagram showing an example of a configuration of an object recognition device according to a first embodiment of the present invention.

FIG. 1 is a block diagram showing an example of a configuration of an object recognition device 3 according to a first embodiment. Hereinafter, for convenience, each processing may itself be described as the active entity of the operation; however, the actual active entity of the operation of each processing is the processor 4.

Figure 2:
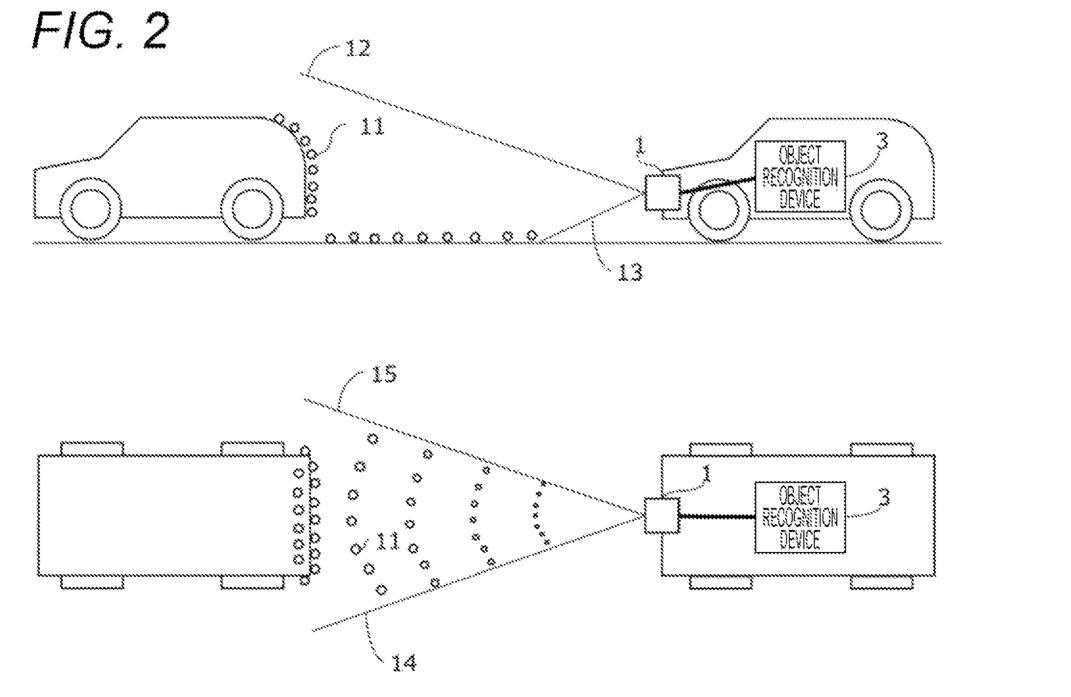
FIG. 2 is a diagram to illustrate a usage mode of the object recognition device according to the first embodiment of the present invention.

FIG. 2 is a schematic diagram showing a usage mode of the object recognition device 3 according to the present application. The object recognition device 3 shown in FIG. 2 is installed in a vehicle and includes an external recognition sensor 1 (a LiDAR sensor or the like). Although one external recognition sensor 1 in FIG. 2 is installed at the height of the bumper of the vehicle, the installation location and the number of external recognition sensors 1 installed may be arbitrarily designed, and are not limited to the mode in FIG. 2.

In the example shown in FIG. 2, the external recognition sensor 1 is capable of obtaining observation points 11 in a plurality of angular directions by radially and discretely emitting a plurality of laser beams within a recognizable angular range in a vertical direction (the range indicated by reference signs 12 to 13 in FIG. 2). Similarly, a plurality of observation points 11 in a plurality of angular directions can be obtained by emitting a plurality of laser beams also within a recognizable angular range in a horizontal direction (the range indicated by reference signs 14 to 15 in FIG. 2). Thus, point cloud data, which constitutes a set of the plurality of observation points 11 having three-dimensional coordinate information, can be acquired by the external recognition sensor 1.

Figure 3:
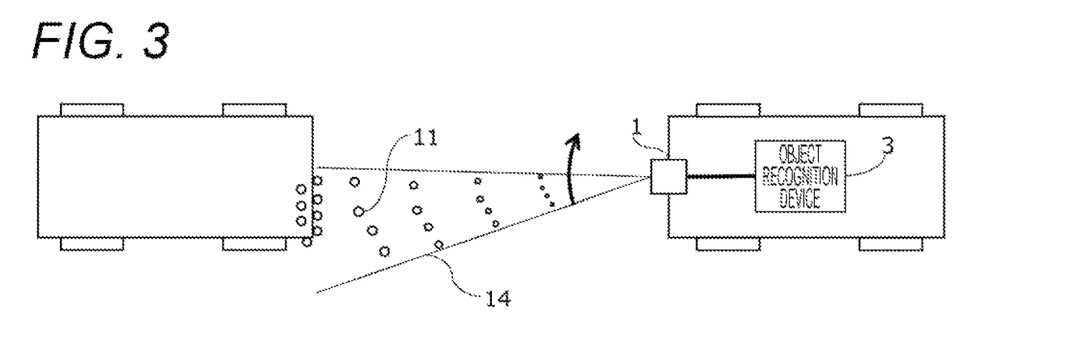
FIG. 3 is a diagram to illustrate an example of a sensing mode of an external recognition sensor according to the first embodiment of the present invention.
Figure 4:
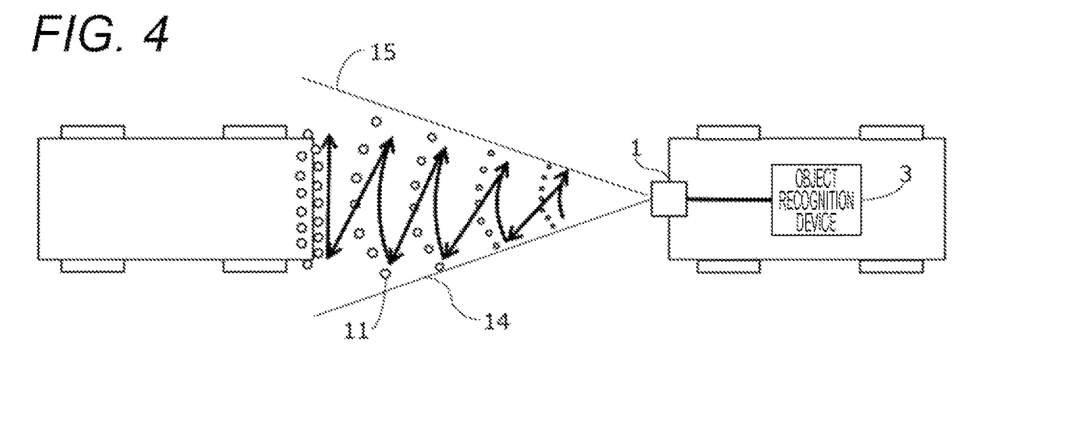
FIG. 4 is a diagram to illustrate an example of a sensing mode of the external recognition sensor according to the first embodiment of the present invention.

At this time, in the examples shown in FIGS. 3 and 4, the external recognition sensor 1 continuously changes the irradiation direction of the laser light so as to sweep from a starting end 14 toward a finishing end 15 within the recognizable angular range in the horizontal direction, thereby generating point cloud data as a set of the plurality of observation points 11 having three-dimensional coordinate information.

As a method of sweeping the irradiation direction of the laser light, a method, as per the example illustrated in FIG. 3, may be considered in which a plurality of laser light irradiation devices installed at different elevation angles in the vertical direction are swept in a horizontal direction from the starting end 14 to the finishing end 15 of the recognizable angle range in the horizontal direction. Alternatively, as per the example shown in FIG. 4, a single laser light irradiation device is swept so as to move back and forth from the starting end 14 to the finishing end 15 in the horizontal direction within the recognizable angular range, and at the same time, the elevation angle of the laser light irradiation device is changed from the lower end 13 to the upper end 12 in the vertical direction, or from the upper end 12 to the lower end 13, within the recognizable angular range, thereby generating point cloud data as a set of a plurality of observation points 11 having three-dimensional coordinate information.

As described above, a method may be considered in which the external recognition sensor 1 sweeps the irradiation direction of the laser light irradiation device in order to generate the point cloud data; however, the sweeping method assumed in the present invention is not limited to the methods shown as examples in FIGS. 3 and 4, and the present invention can also be applied to cases where any sweeping method is used. Furthermore, the method of representing the point cloud data is not limited to a coordinate format in a three-dimensional space, and the present invention can also be applied, for example, to a case where the point cloud data is represented using another method having an information amount equal to or more than the coordinate information in the three-dimensional space, such as a method using polar coordinate representation. Hereinafter, for the sake of a consistent description, the point cloud data is treated as information of a coordinate format (x, y, z) in a three-dimensional space.

Figure 5:
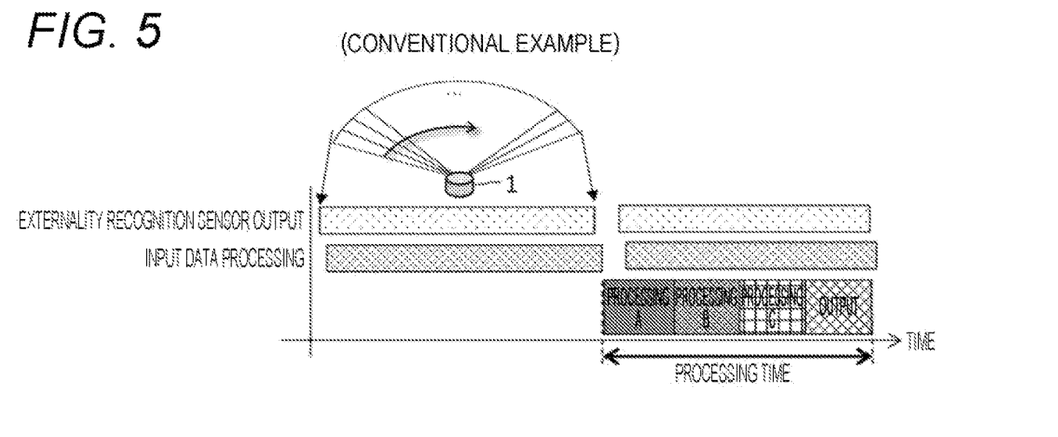
FIG. 5 is a diagram to illustrate a time-series relationship between the sensing by the external recognition sensor according to the first embodiment of the present invention and execution timing of a conventional recognition algorithm.

In FIG. 5, a typical processing procedure by a conventional object recognition device using point cloud data is shown on a time axis. In the case of a conventional object recognition device, because the recognition processing is performed using the point cloud data including all the three-dimensional coordinate information within the recognizable angular range obtained by the sweep, the sweep is first completed, and then the input data is transformed into the coordinate information, whereupon the recognition processing A and the recognition processing B are sequentially performed to detect the object from the point cloud data, and the results are outputted.

Figure 6:
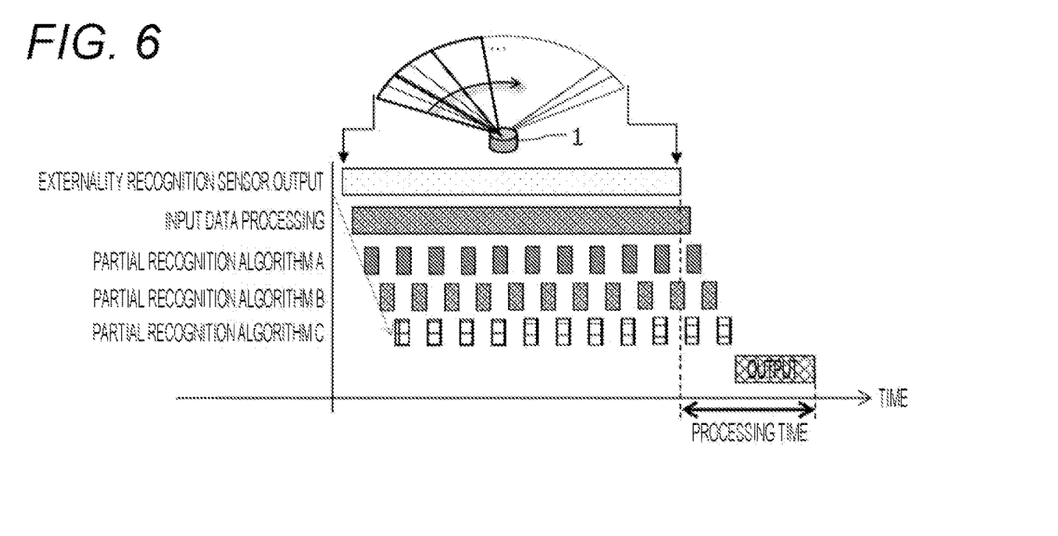
FIG. 6 is a diagram to illustrate a time-series relationship between the sensing of the external recognition sensor according to the first embodiment of the present invention and execution timing of a partial recognition algorithm in the object recognition device to which the present invention is applied.

At this time, it is desirable to shorten the processing time required from the completion of the sweep until the outputting of results as much as possible because of the performance requirements of the in-vehicle system in which the object recognition device is mounted. A method for reducing the processing time of the conventional object recognition device illustrated in FIG. 5 is shown in FIG. 6. Here, it is illustrated that the point cloud data obtained by processing the input data from the external recognition sensor is divided by the number of fixed observation points 11 or the angular range of the sweep, and the processing A, the processing B, and the processing C are partially repeated using the partial point cloud data contained in each divided section.

After the input data processing from the external recognition sensor, the partial recognition algorithm A, the partial recognition algorithm B, and the partial recognition algorithm C are arranged in the form of a software pipeline in an interdependent relationship in which each processing result becomes an input for the subsequent processing. In the example shown in FIG. 6, the result of the input data processing is an input of the partial recognition algorithm A, the result of the partial recognition algorithm A is an input to the partial recognition algorithm B, and the partial recognition algorithm C also has a similar dependency.

With such a configuration, part of the recognition processing can be partially performed in parallel without waiting for completion of the sweep of the laser light irradiation device, and the recognition processing for the point cloud data contained in some point cloud data sections is already complete upon completion of the sweep of the laser light irradiation device, and the remaining point cloud data is processed and the results are outputted. Therefore, the processing time of the object recognition device in the case of applying the present invention illustrated in FIG. 6 is shortened in comparison with the processing time of the conventional object recognition device illustrated in FIG. 5.

A method for realizing the software-pipelined processing arrangement shown in FIG. 6 will be described with reference to FIG. 1. A recognition algorithm for recognizing an object using point cloud data is configured from a plurality of partial recognition algorithms. Each partial recognition algorithm is arranged in the form of a software pipeline, and has a dependent relationship in which a processing result of an upper partial recognition algorithm becomes an input to a lower partial recognition algorithm.

In the example shown in FIG. 1, the partial recognition algorithm A is processing positioned at the top of the software pipeline, and the processing result data is written, as a task, to the task queue A region in the memory after determination processing by the enqueue determination unit A. The partial recognition algorithm B always checks the task queue A region in the memory, extracts an unprocessed task if any exists, and uses the extracted task as input data to the partial recognition algorithm B to execute the algorithm. As described above, the processing result data is written, as a task, to the task queue B region in the memory after a determination by the enqueue determination unit B. In addition, the task extracted from the task queue and processed is deleted from the memory. The behavior based on the partial recognition algorithm C is also the same as that described above.

The active entity that implements each partial recognition algorithm is the processing unit 5. In a case where there are a plurality of processing units 5, the allocation of partial recognition algorithms to the processing units 5 is decided by the task priority decision unit. The task priority decision unit compares the total amount of tasks written in the respective task queue regions in the memory, and sets a high priority for a task queue in which a large number of pieces of unprocessed tasks remain, and sets a low priority for a task queue in which a small number of pieces of unprocessed tasks are present.

The processing unit 5 sequentially checks the priorities set in the task queue, and operates to preferentially execute the partial recognition algorithms corresponding to the unprocessed tasks in the task queue for which a high priority has been set. With the above configuration, it is possible to dynamically distribute processing resources with respect to an increase or decrease in a specific task amount due to a change in the density of sensing results, an increase or decrease in a recognition target, or the like caused by a status change in the outside world, thereby improving the processing efficiency.

An example of the task priority decision unit will be described with reference to FIG. 11. The purpose of the task priority decision unit is, in a case where the processor 4 to which the present invention is applied has a plurality of processing units 5, to decide which of the respective processing units 5 is to be allocated for execution of a certain partial recognition algorithm.

The allocation of the processing units 5 is decided according to the priorities of the task queues being processed by the respective partial recognition algorithms decided on by the task priority decision unit. In FIG. 11, the priorities of the task queues are represented by numbers, where a smaller number means a higher priority. The plurality of processing units are allocated to execute the partial recognition algorithm set with the highest priority according to the priorities set in the task queue corresponding to each partial recognition algorithm.

In the priority decision method, the amounts of unprocessed tasks written in each task queue are compared, and priorities are assigned in descending order starting with the partial recognition algorithm having, as an input, the task queue having the largest amount of unprocessed tasks. In the example shown in FIG. 11, it can be seen that the unprocessed task amounts are increasingly large for task queues A, B, and C in that order, and thus, the partial recognition algorithms corresponding to these task queues are assigned a higher priority in the order A, B, and then C.

Figure 12:
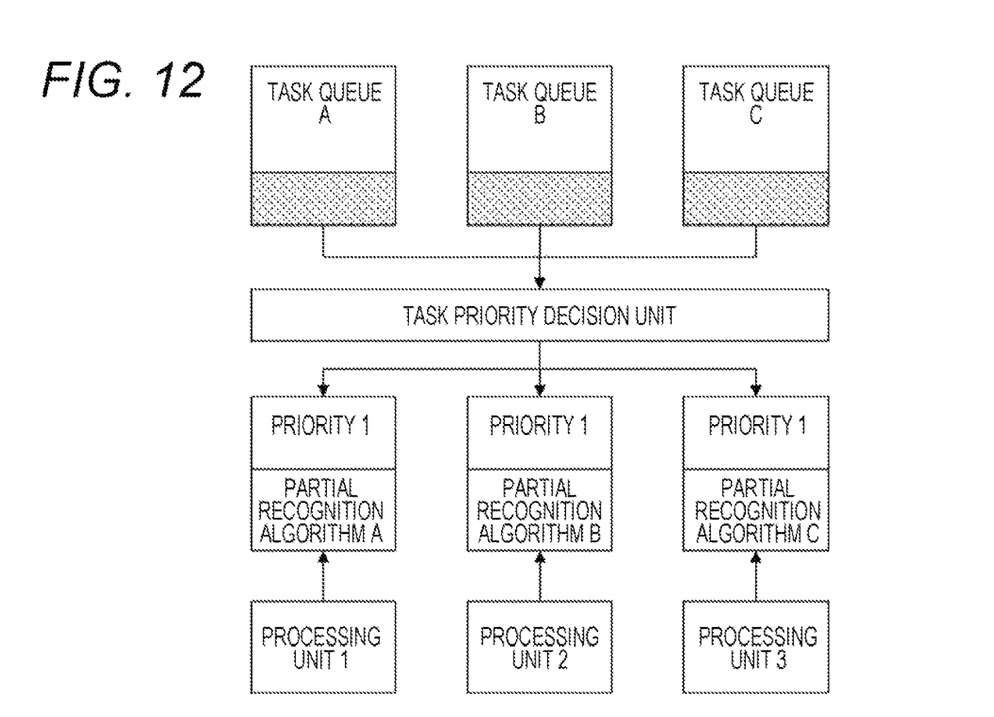
FIG. 12 is a diagram to illustrate an example of an operation of a task priority decision unit according to the first embodiment of the present invention.
Figure 13:
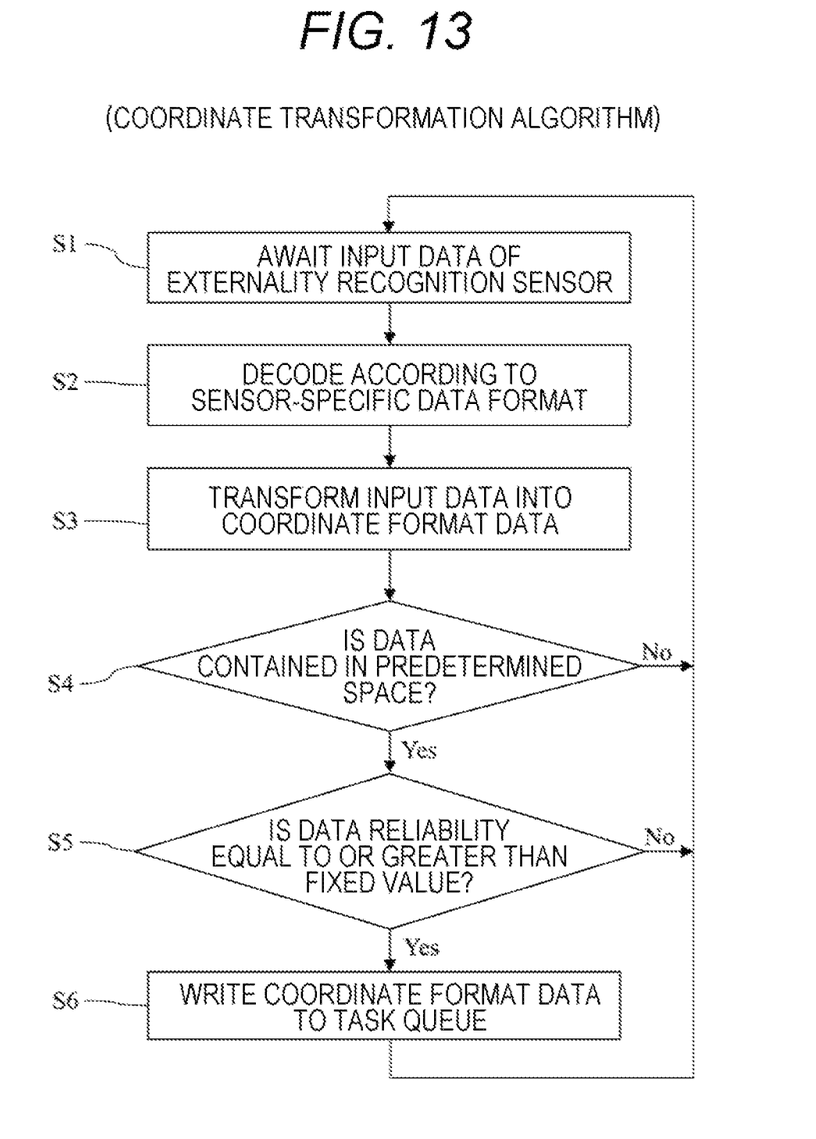
FIG. 13 is a flowchart to illustrate a processing procedure of a coordinate transformation algorithm serving as an example of a partial recognition algorithm according to the first embodiment of the present invention.
Figure 14:
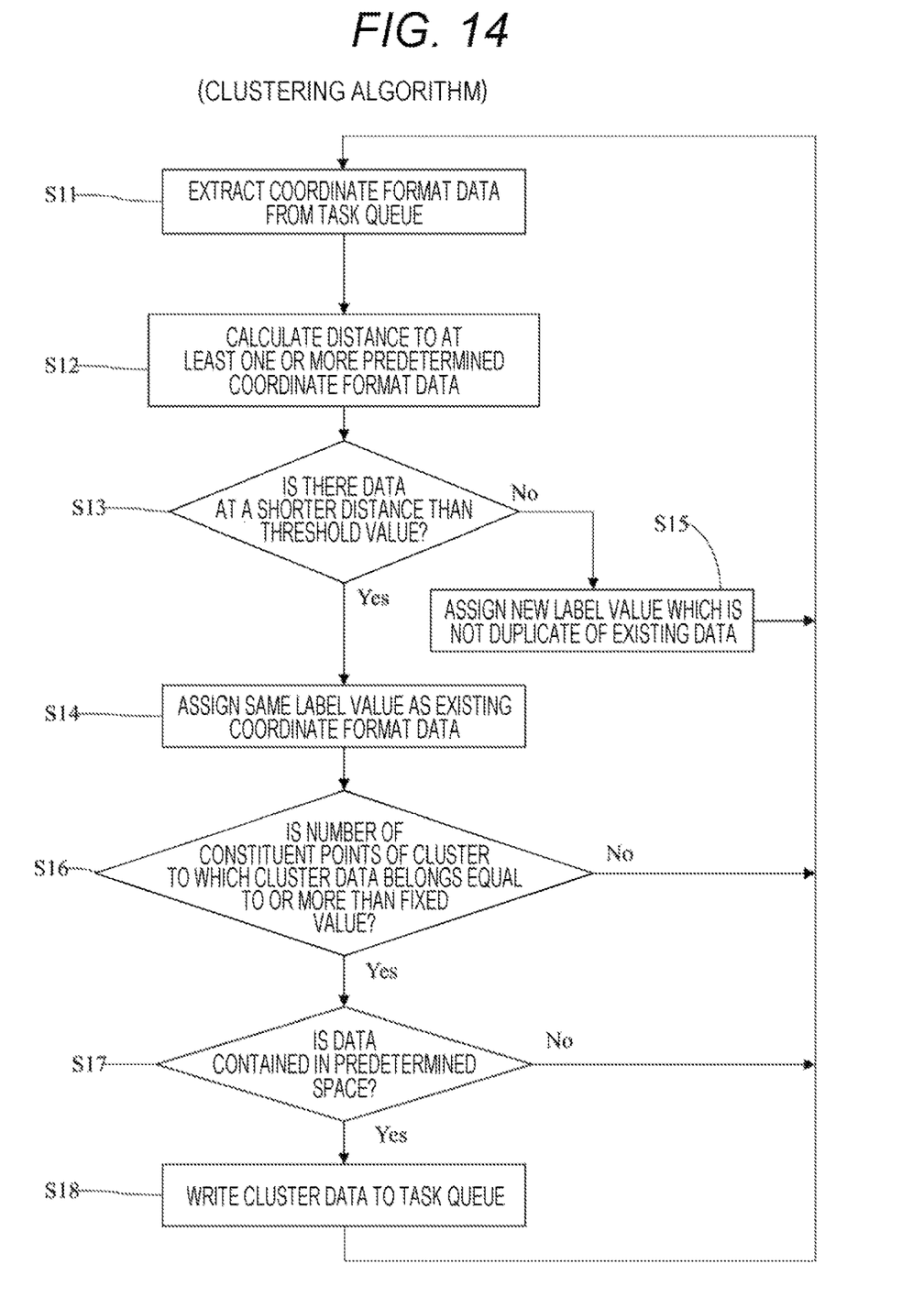
FIG. 14 is a flowchart to illustrate a processing procedure of a clustering algorithm serving as an example of a partial recognition algorithm according to the first embodiment of the present invention.
Figure 15:
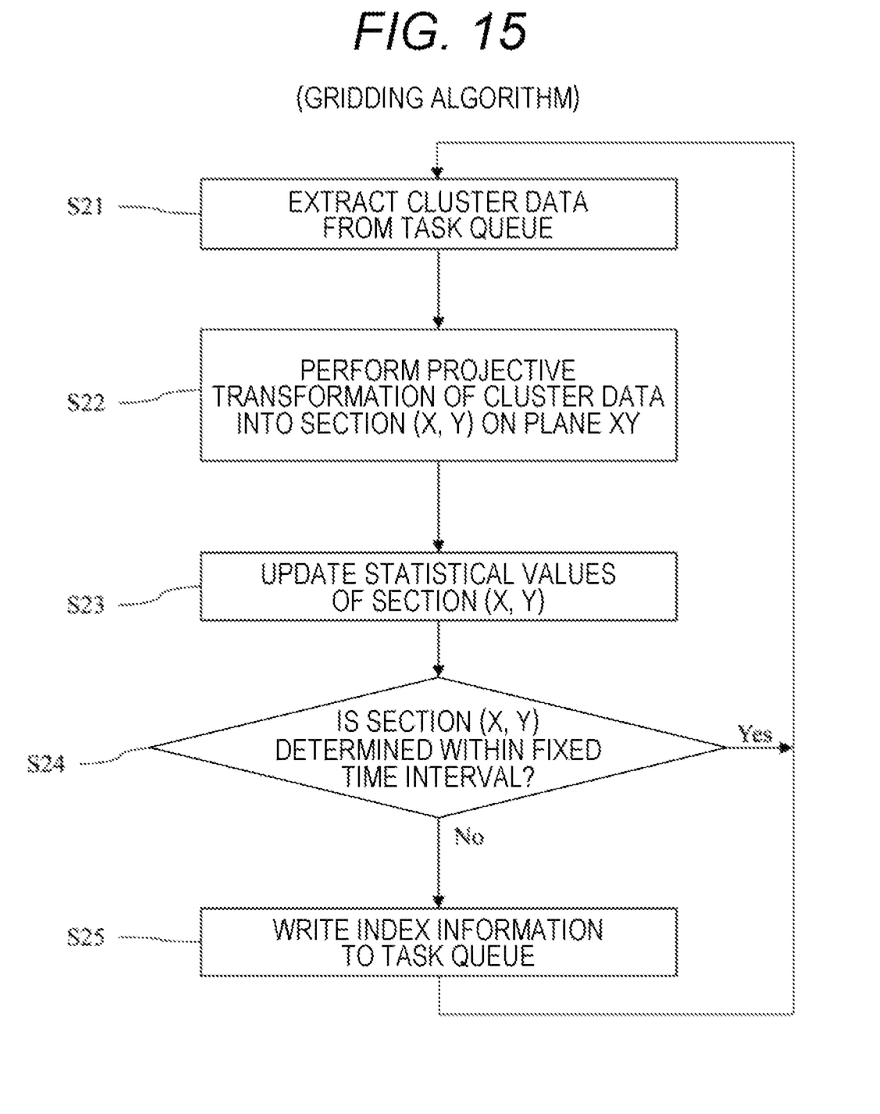
FIG. 15 is a flowchart to illustrate a processing procedure of a gridding algorithm serving as an example of a partial recognition algorithm according to the first embodiment of the present invention.
Figure 16:
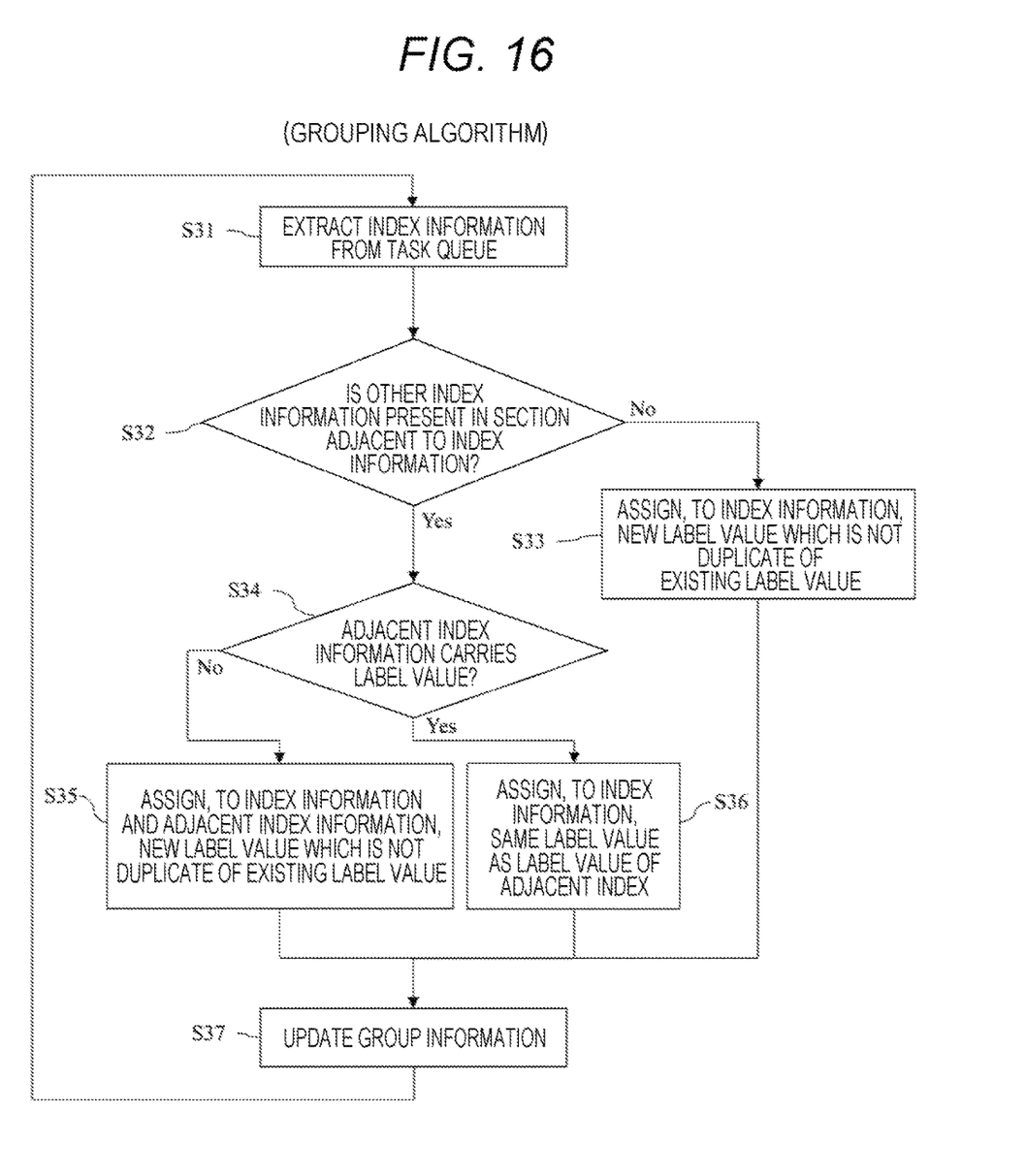
FIG. 16 is a flowchart to illustrate a processing procedure of a grouping algorithm serving as an example of a partial recognition algorithm according to the first embodiment of the present invention.

In addition, in FIG. 12 it can be seen that, in a case where the unprocessed task amounts of the task queues are the same, a value of the same priority is assigned to the corresponding partial recognition algorithms, and in this case, a plurality of processing units are equally allocated to each partial recognition algorithm.

Figure 7:
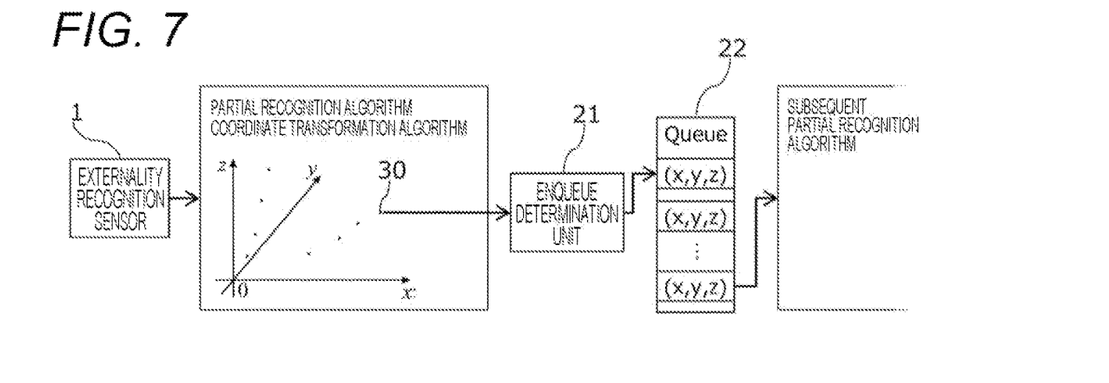
FIG. 7 is a diagram to illustrate a processing procedure of a coordinate transformation algorithm serving as an example of a partial recognition algorithm according to the first embodiment of the present invention.

FIG. 7 shows a coordinate transformation algorithm serving as an example of a partial recognition algorithm. The coordinate transformation algorithm uses data that is transmitted from an external recognition sensor 1 such as a LiDAR sensor as an input (S1), decodes the data according to the sensor-specific data format (S2), and performs transformation processing into coordinate-format data 30 that can be recognized by a subsequent partial recognition algorithm (S3).

Although FIG. 7 illustrates the coordinate-format data using a three-dimensional orthogonal coordinate system, the mode of representation of the coordinate-format data 30 is not limited to the three-dimensional orthogonal coordinate system, and may also be a format suitable for a partial recognition algorithm of the subsequent stage. For the sake of consistency in this description, (x, y, z) is used as representative data using a three-dimensional orthogonal coordinate system with the installation position of the external recognition sensor serving as the origin.

Depending on the sensor which is actually operated, sometimes information equal to or greater than the coordinate information, such as the strength and the speed of the signal at the observation point, can be acquired. However, naturally, such information can be handled in the same manner as the coordinate-format data 30, and the range of applications of the present invention is not limited only to the coordinate-format data 30.

The coordinate-format data 30 is inputted, as an output of the coordinate transformation algorithm, to an enqueue determination unit 21 to determine whether to write the coordinate-format data to a task queue region 22 for the coordinate transformation algorithm. In the enqueue determination of the coordinate transformation algorithm, it is determined whether the data can be used as an input to a subsequent partial recognition algorithm, and data which passes the determination is written as a task to the task queue region 22 for the coordinate transformation algorithm (S6). The data rejected by the determination is not written to the above-described task queue region 22, and is erased on the spot or is written to another memory region as rejection data.

In a specific determination method of the enqueue determination unit 21, a determination is made based on whether the coordinate-format data 30 is contained in a predetermined space. In the three-dimensional orthogonal coordinate system in FIG. 7, for example, upper and lower limits are set for the coordinate values in the X-axis direction, the Y-axis direction, and the Z-axis direction, respectively, and it is determined that the coordinate-format data 30 contained within the space of the rectangular parallelepiped defined by the upper and lower limit values is regarded as passing data, while the coordinate-format data 30 located outside the space is rejected (S4).

Alternatively, the distance information to the coordinate-format data 30 may be used to reject the coordinate-format data 30 closer than a predetermined threshold value, or to reject the coordinate-format data 30 farther than a fixed threshold value, or both may be used to make the determination. By way of alternative, in a case where it can be seen that the specific coordinate-format data 30 has an invalid value as information included in the sensor-specific data format, rejection may be performed (S5). Alternatively, in a case where the strength, reliability, accuracy, or the like of the coordinate-format data 30 is indicated as information included in the sensor-specific data format, rejection may be performed when the value thereof is equal to or less than a predetermined threshold value (S5).

Figure 8:
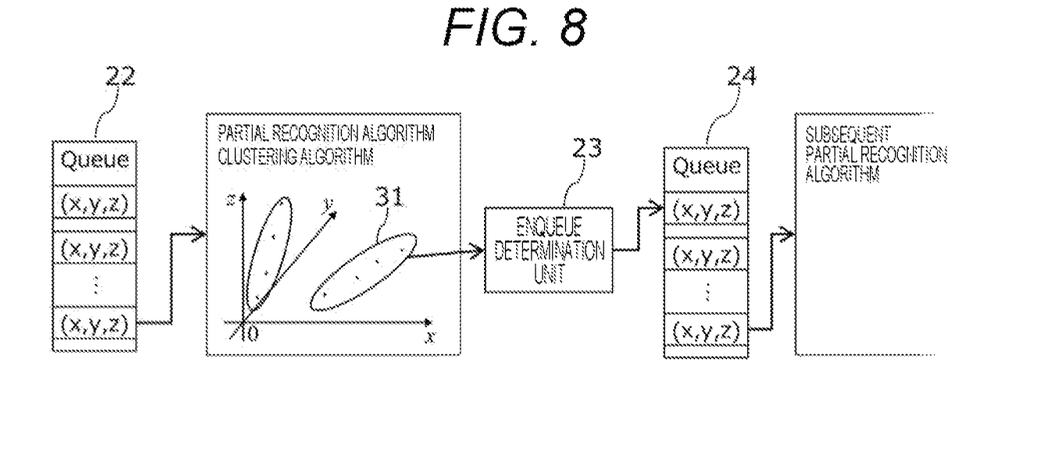
FIG. 8 is a diagram to illustrate a processing procedure of a clustering algorithm serving as an example of a partial recognition algorithm according to the first embodiment of the present invention.

FIG. 8 shows a clustering algorithm serving as an example of a partial recognition algorithm. The clustering algorithm uses the coordinate-format data 30 as an input (S11), and transforms the plurality of pieces of coordinate-format data 30 into cluster data 31 to which label information to indicate that the same object has been detected is added for the plurality of pieces of coordinate-format data 30, in a case where the plurality of pieces of coordinate-format data 30 is sufficiently in close contact to determine that the same object has been detected or in a case where a relationship is recognized between the plurality of pieces of coordinate-format data.

There are considered to be various implementation methods for the evaluation of the closeness and the evaluation of the relationship between the pieces of coordinate-format data 30 performed in the clustering algorithm. As an example, a method may be used in which the distance between two pieces of coordinate-format data 30 is calculated (S12), and if the distance is shorter than a predetermined threshold value, the same label value is given to each piece of coordinate-format data 30 (S14), and in which a transformation operation into the cluster data 31 is repeatedly performed on all the existing coordinate-format data 30 as a target.

When assigning labels, in a case where existing cluster data 31 already has a significant label value, the same label is given to the other coordinate-format data 30. Furthermore, in a case where the degree of closeness or relationship is not recognized in an evaluation with any existing coordinate-format data 30, this coordinate-format data 30 is assigned, as a new label value, a value that is not a duplicate of any label value already assigned within a fixed time interval (S15).

The cluster data 31 is inputted as an output of the clustering algorithm to the enqueue determination unit 23 in order to determine whether to write to the task queue region 24 for the clustering algorithm. The enqueue determination unit 23 of the clustering algorithm determines whether the data can be used as an input to a subsequent partial recognition algorithm, and data which passes the determination is written as a task to the task queue region 24 for the clustering algorithm (S18). The data rejected by the determination is not written to the above-described task queue region 24, and is erased on the spot or is written to another memory region as rejection data.

In a specific determination method in the enqueue determination unit 23, a determination is made based on whether the coordinate-format data 30 belongs to cluster data 31 having a certain number or more of pieces of coordinate-format data 30. When the coordinate-format data 30 does not belong to any cluster data 31 or the number of pieces of coordinate-format data 30 held by the cluster data 31 to which the data belongs is equal to or less than a fixed number, the coordinate-format data 30 is treated as noise and is not regarded as passing data (S16).

Meanwhile, if it is determined, based on cluster data 31 configured from a certain number or more of pieces of coordinate-format data 30, that some object is being observed, the enqueue determination unit 23 determines the data to be passing data. Because the number of constituent points of the cluster data 31 is updated as the processing of the clustering algorithm advances, even if the data is not deemed to be passing data according to a determination at a certain timing, there is a possibility that the pass condition will be satisfied subsequently, and thus, the data is not rejected immediately.

In addition, in the three-dimensional orthogonal coordinate system in FIG. 8, upper and lower limits may be set for the coordinate values in the X-axis direction, the Y-axis direction, and the Z-axis direction, respectively, and it may be determined that the cluster data 31 contained within the space of the rectangular parallelepiped defined by the upper and lower limits is regarded as passing data, while the cluster data 31 located outside the space is rejected (S17).

Figure 9:
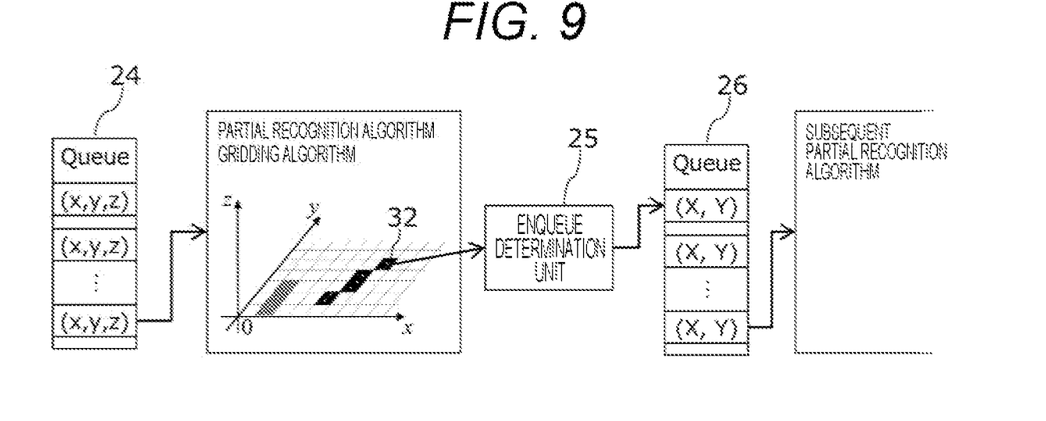
FIG. 9 is a diagram to illustrate a processing procedure of a gridding algorithm serving as an example of a partial recognition algorithm according to the first embodiment of the present invention.

FIG. 9 shows a gridding algorithm serving as an example of a partial recognition algorithm. The gridding algorithm uses the cluster data 31 as an input (S21), performs projective transformation of coordinate information indicated by the cluster data 31 on the plane XY defined by the X axis and the Y axis shown in FIG. 9 (S22), and determines to which section (X, Y) the coordinate information indicated by the projective-transformed cluster data 31 belongs among a plurality of rectangular sections arranged in a lattice map shape provided in advance on the plane XY. After the section 32 on the lattice map to which a certain cluster data 31 belongs is determined, an operation to update the statistical data associated with the section 32 and held in memory is performed (S23).

The specific content of the statistical data managed in association with a certain section 32 is the number of at least one or more pieces of cluster data 31 associated with the certain section 32, the maximum value and the minimum value of each element of the cluster data 31, the variance value of each element of the observation point, the average value of each element of the observation point, the total number of times that the cluster data has been associated with a certain time until now, the number of times that the cluster data 31 has been continuously associated, and so forth, and setting various other statistical information as the statistical data may be considered.

Index information (X, Y) indicating an address on the lattice map of the section 32 for which the statistical data has been updated is inputted to the enqueue determination unit 25 as an output of the gridding algorithm in order to determine whether to write data to the task queue region 26 for the gridding algorithm.

The enqueue determination unit 25 of the gridding algorithm determines whether the data can be used as an input to a subsequent partial recognition algorithm, and data which passes the determination is written as a task to the task queue region 26 for the gridding algorithm (S25). The data rejected by the determination is not written to the above-described task queue region 26, and is erased on the spot or is written to another memory region as rejection data.

In a specific determination method in the enqueue determination unit 25, if index information indicating a certain section 32 for which statistical data has been updated in a certain sensing cycle has not already been determined in the enqueue determination unit 25, for example, index information indicating an address of the same section 32 within a certain time interval defined by the sensing cycle, the information is deemed to have passed, and conversely, when index information indicating an address of the same section 32 has already been determined within a certain time interval in the enqueue determination unit 25, the information is regarded as information that would cause a duplicate operation in a subsequent partial recognition algorithm, and is rejected (S24).

Figure 10:
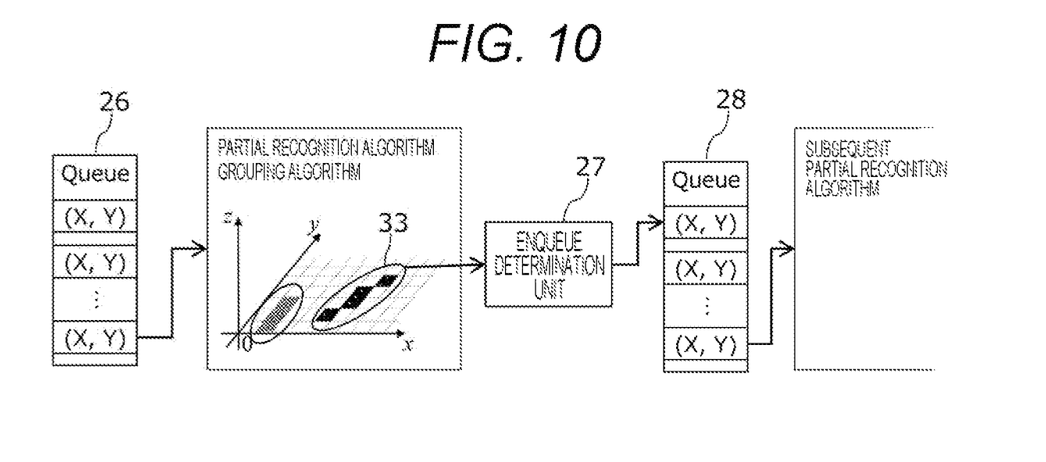
FIG. 10 is a diagram to illustrate a processing procedure of a grouping algorithm serving as an example of a partial recognition algorithm according to the first embodiment of the present invention.

FIG. 10 shows a grouping algorithm serving as an example of a partial recognition algorithm. The grouping algorithm uses index information representing a section on the lattice map as an input (S31), and, in a case where the index information is sufficiently close enough to determine that the same object has been detected for a plurality of sections, or in a case where a relationship is recognized between the sections, transforms the index information into group information 33 to which label information is assigned to indicate that the same object has been detected for the plurality of sections.

There are considered to be various implementation methods for evaluating the degree of closeness and evaluating the relationship of the sections processed by the grouping algorithm. As an example, for a plurality of sections adjacent to a section 32 to be evaluated which is present on the lattice map, if there is a section associated with the index information among the sections (S32), the section 32 to be evaluated is regarded as a section constituting the same group as that section, and if an adjacent section has a label value, the same label value is assigned (S36), and if an adjacent section does not have a label value, a label value that is not a duplicate of a label value assigned to an existing group is assigned to the index information corresponding to each section (S35).

If there is no section associated with the index information in any of the sections adjacent to the section 32 to be evaluated, the section 32 to be evaluated may be regarded as a section constituting a new group, and a label value that is not a duplicate of a label value assigned to an existing group may be assigned (S33). The new index information is added and updated to the group information 33 corresponding to the label value as the existing or new group (S37).

In any of the enqueue determination units, data that is not rejected by the determination is written to the task queue region for each partial recognition algorithm as a task to be processed by the subsequent partial recognition algorithm. In any of the task queue regions, data is stored in a first-in first-out (FIFO) data arrangement order, and when a subsequent partial recognition algorithm acquires a task from this task queue region, the data is acquired in order starting with the oldest data.

Features of the present embodiment can also be summarized as follows.

The object recognition device 3 includes: a processor 4 that inputs point cloud sensor data sensed by a sensor (external recognition sensor 1) to a software pipeline formed of a plurality of stages and executes object recognition processing; and a memory. Note that, in the present embodiment, a memory built into the processor 4 is used as shown in FIG. 1, but a memory provided outside the processor 4 may also be used.

As shown in FIG. 1, the processor 4 includes a plurality of processing units 5 (processor cores) that executes processing (processing according to the partial recognition algorithms A to C) constituting the object recognition processing allocated to each of the stages A to C. The memory has a plurality of task queue regions (task queues A to C) that temporarily stores the output data of each of the stages. In a case where the output data of each of the stages is not valid upon input to the subsequent stage, the processor 4 rejects the output data without storing same in the respective task queue regions. As a result, the processing load of the subsequent stage can be reduced.

Specifically, the processor 4 includes a plurality of enqueue determination units A to C that determines whether to store the output data of each of the stages A to C in the respective task queue regions (the task queues A to C). In a case where the output data of each of the stages is not valid upon input to the subsequent stage, each enqueue determination unit rejects the output data without storing same in the respective task queue regions. Note that the active entity that performs the processing of each of the enqueue determination units A to C is, for example, each processing unit 5.

In other words, each of the enqueue determination units A to C stores the output data in the respective task queue regions (the task queues A to C) only in a case where the output data of each of the stages A to C is valid upon input to the subsequent stage. As a result, for example, the resources of the processor and the memory can be effectively utilized for each stage.

In the present embodiment, each of the processing units 5 performs a calculation in each of the stages A to C using the sensor data or the output data stored in the task queue region (task queues A to C) of the preceding stage. Note that the sensor data is stream data outputted from a sensor (the external recognition sensor 1 such as a LiDAR sensor) and sequentially stored in memory. As a result, because the sensor data is sequentially processed in the software pipeline, the time required for the object recognition processing of one scan is shorter than that of a conventional example.

Figure 11:
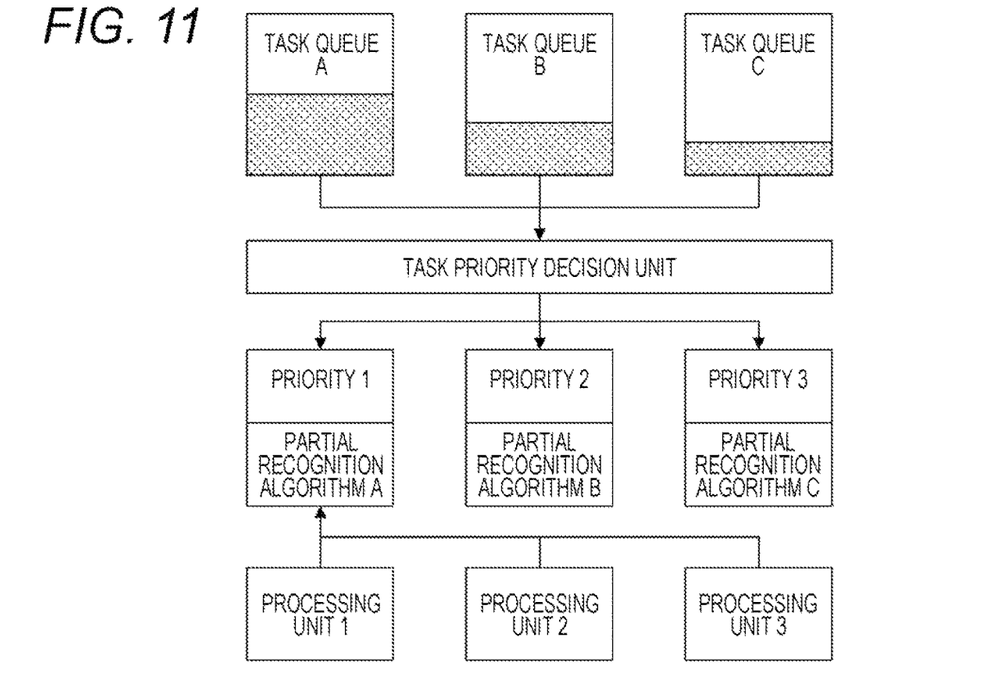
FIG. 11 is a diagram to illustrate an example of an operation of a task priority decision unit according to the first embodiment of the present invention.

As shown in FIG. 11, the processor 4 shown in FIG. 1 includes a task priority decision unit that determines the priorities of the task queue regions according to the number of pieces of unprocessed output data (tasks) stored in the task queue regions (task queues A to C) of each stage. For example, the task priority decision unit assigns higher priorities to the task queue regions in the order of the number of pieces of unprocessed output data (tasks) stored in the task queue regions (task queues A to C) of each of the stages, for example. The processor 4 dynamically allocates the plurality of processing units 5 to a subsequent stage that processes the output data stored in the task queue regions (the task queues A to C) to which the highest priority is assigned. As a result, the processing load for each stage is equalized, and the throughput can be improved.

As shown in FIG. 6, the processor 4 executes the object recognition processing by using the software pipeline for each piece of sensor data corresponding to a predetermined range of azimuth angles sensed by the sensor (external recognition sensor 1). As a result, the time required for the object recognition processing of one scan is shorter than that of a conventional example.

In a case where observation values cannot be acquired, the sensor (external recognition sensor 1) shown in FIG. 7 includes, in the sensor data, information indicating that the sensor data is invalid, and outputs the sensor data. In a case where the sensor data contains information indicating that the sensor data is invalid, the processing unit 5 of the first stage includes, in the output data (the coordinate-format data 30), information indicating that the output data is invalid, and outputs the output data. In a case where the output data includes information indicating that the data is invalid, the enqueue determination unit 21 of the first stage determines that the output data of the first stage is not valid upon input to the subsequent stage. In a case where the output data (the coordinate-format data 30) of the first stage is not valid upon input to the subsequent stage, the enqueue determination unit 21 of the first stage does not store the output data in the task queue region 22 of the first stage. As a result, the output data in a case where observation values cannot be acquired is excluded, and the processing load of the subsequent stage can be reduced.

Furthermore, in a case where the output data of the stage is within the range of the three-dimensional space which the sensor (external recognition sensor 1) is capable of sensing, the enqueue determination unit 21 of at least one stage determines that the output data of the stage is valid upon input to the subsequent stage. As a result, it is possible to determine whether the output data is valid in the light of the performance (specifications) of the sensor.

As shown in FIG. 9, the enqueue determination unit 25 of at least one stage determines that second and subsequent duplicate output data among the output data (X, Y) of the stage(s) is not valid. As a result, the processing load of the subsequent stage can be further reduced.

The object recognition processing includes: a first step, as shown in FIG. 7, of decoding the sensor data and transforming the decoded sensor data into the coordinate-format data 30, in a first stage; a second step, as shown in FIG. 8, of grouping pieces of the coordinate-format data 30 which are located close to one another to generate the cluster data 31, in a second stage; a third step, as shown in FIG. 9, of performing projective transformation of the cluster data 31 into the section 32 on the plane to generate the index information (X, Y) indicating the position of the section 32, in a third stage; and a fourth step, as shown in FIG. 10, of grouping pieces of the index information (X, Y) which are located close to one another, in a fourth stage. As a result, the latency of the object recognition processing can be shortened in comparison with that of a conventional example.

As shown in FIG. 6, a plurality of software pipelines is provided, and sensor data corresponding to a predetermined range of the azimuth angle sensed by the sensor (external recognition sensor 1) is inputted to the corresponding software pipeline. The processor 4 performs object recognition processing by means of respective software pipelines. As a result, because the sensor data corresponding to the predetermined range of each azimuth angle is sequentially processed in each software pipeline, the latency of the object recognition processing can be further shortened in comparison with that of a conventional example.

As shown in FIG. 1, each processing unit 5 executes processing according to partial recognition algorithms A to C representing processing algorithms that constitute the object recognition processing allocated to each of the stages. As a result, the processing allocated to the each of the stages can be performed as software.

As described above, with the present embodiment, the processing load can be reduced in the object recognition processing in which point cloud sensor data is used as an input.

Second Embodiment

The object recognition device 3 to which the present invention is applied can also use a radar sensor as the external recognition sensor 1 serving as an input to the device. The object recognition device 3 to which the present invention is applied as disclosed in the first embodiment can be configured also for point cloud data as a set of observation points acquired using a radar sensor. In addition, the object recognition device 3 to which the present invention is applied as disclosed in the first embodiment can be configured similarly for point cloud data as a set of observation points extracted from image data acquired using a camera sensor.

Third Embodiment

In the object recognition device 3 to which the present invention is applied, the external recognition sensor 1 to be an input to the device is not limited to one type, rather, a plurality of types of sensors may be used in a heterogeneous mixture, the number of sensors to be configured is not limited to one, and the object recognition device 3 to which the present invention is applied as disclosed in the first and second embodiments may also be configured using a plurality of sensors.

Note that the present invention is not limited to or by the above-described embodiments, and includes various modifications. For example, the above-described embodiments have been described in detail for easy understanding of the present invention, and are not necessarily limited to those having all the described configurations.

In addition, some or all of the above-described configurations, functions, and the like may be realized by hardware, for example, by a design using an integrated circuit. In addition, each of the above-described configurations, functions, and the like may be realized by software as a result of the processor interpreting and executing a program that realizes the respective functions. Information such as a program, a table, and a file for realizing each function can be stored in a recording device such as a memory, a hard disk, and a solid state drive (SSD), or a recording medium such as an IC card, an SD card, and a DVD.

Note that Examples of the present invention may take the following forms.

(1) An object recognition device includes: a memory that sequentially receives and stores point cloud data of the outside world which is acquired through sensing by an external recognition sensor; and a calculation unit that executes object recognition processing based on the point cloud data stored in the memory and an object recognition algorithm configured from a plurality of partial recognition algorithms, wherein the calculation unit includes an arithmetic processing unit that constitutes a software pipeline formed of a plurality of stages that performs a calculation based on each of the partial recognition algorithms, the memory has a plurality of task queue regions that temporarily stores input/output data to each stage, the input/output data is data that is inputted to each of the stages and processing result data obtained through arithmetic processing in a preceding stage, each of the stages performs a calculation using the input data stored in the task queue region or the processing result data of the preceding stage, the calculation unit has a plurality of enqueue determination units that determines whether to input the processing result data of the preceding stage to a subsequent stage, and the enqueue determination units determine whether the processing result data of the preceding stage is a valid value upon input to the subsequent stage, and in a case where it is determined that the processing result data is not a valid value, discard the data without adding same to the corresponding task queue region.

(2) The object recognition device according to (1), wherein the calculation unit further includes a task priority decision unit that sets task processing priorities of respective tasks for the plurality of task queue regions, and the task priority decision unit assigns higher priorities to the task queue regions in the order of the number of pieces of unprocessed data held in the plurality of task queue regions at each of the stages.

(3) The object recognition device according to (2), wherein an arithmetic resource is preferentially provisioned for the stage of the task queue region to which the high priority is assigned, and the point cloud data is sequentially transmitted to the memory every time a predetermined observation point is acquired in sensing and sequentially processed by the arithmetic unit.

(4) The object recognition device according to (1), wherein the case where the data does not have the valid values is a case where observation values cannot be acquired by the external recognition sensor, and in a case where the observation values are not obtained, data indicating that the data is invalid is outputted, and the observation values are invalidated.

(5) The object recognition device according to claim (4), wherein, in the case where the data does not have the valid values, the observation values are not outputted to the task queue region.

(6) The object recognition device according to (1), wherein the data representing the valid values is sensing data within an observation range of a three-dimensional space to be recognized by the object recognition device.

(7) The object recognition device according to (1), wherein, in a case where data similar to the point cloud data is inputted through sensing, the data similar to the point cloud data is invalidated, and the inputted point cloud data is used for sensing.

(8) The object recognition device according to (1), wherein different image processing is performed in each of the stages, the image processing including: a first step of decoding data acquired from the external recognition sensor and converting the data into coordinate values; a second step of grouping objects that exist in positions close to each other at coordinates among the coordinate values obtained in the first step and recognizing the objects as observation points; a third step of matching the observation point information obtained in the second step to a plane XY; and a fourth step of grouping and recognizing the information associated in the third step with close observation points.

(9) The object recognition device according to (1) to (8), wherein a plurality of the pipeline is provided, data acquired by the external recognition sensor through sensing at a predetermined angle is inputted to each of the corresponding pipelines, and a sequential calculation is executed based on the plurality of partial recognition algorithms.

In the above configuration, the calculation unit includes a task priority decision unit that sets processing priorities of respective tasks to the plurality of task queue regions, the task priority decision unit assigns higher priorities to the task queue regions in the order of the number of pieces of unprocessed data held in the plurality of task queue regions at each of the stages, and preferentially provisions an arithmetic resource for the stage of the task queue region to which the high priority is assigned, and the point cloud data is sequentially transmitted to the memory every time a predetermined observation point is acquired in sensing and is sequentially processed by the arithmetic unit, thereby enabling the loads of arithmetic processing units operating in parallel to be leveled and processing efficiency to be improved.

In addition, the case where the data does not have the valid values is a case where observation values cannot be acquired by the external recognition sensor, and in a case where the observation values are not obtained, data indicating that the data is invalid is outputted, and the observation values are invalidated, and in a case where the observation values are not valid values, the observation values are not outputted to the task queue region, and data for which the values are valid values is sensing data within an observation range of a three-dimensional space to be recognized by the object recognition device, and processing target tasks are limited to valid values, thereby reducing the overall processing amount.

Further, in a case where data similar to the point cloud data is inputted through sensing, duplicate processing can be eliminated as a result of the data similar to the point cloud data being invalidated, and the inputted point cloud data being used for sensing.

Moreover, different image processing is performed in each of the stages of the software pipeline, the image processing including: a first step of decoding data acquired from the external recognition sensor and converting the data into coordinate values; a second step of grouping objects that exist in positions close to each other at coordinates among the coordinate values obtained in the first step and recognizing the objects as observation points; a third step of matching the observation point information obtained in the second step to a plane XY; and a fourth step of grouping and recognizing the information associated in the third step with close observation points, thereby enabling processing by converting independent image processing to parallel processing, and improving processing efficiency.

REFERENCE SIGNS LIST 1 external recognition sensor
3 object recognition device
4 processor
5 processing unit 11 observation point
12 vertical upper end within recognizable angular range
13 vertical lower end within recognizable angular range
14 horizontal starting end within recognizable angular range
15 vertical finishing end within recognizable angular range
21 enqueue determination unit in coordinate transformation algorithm
22 task queue region in coordinate transformation algorithm
23 enqueue determination unit in clustering algorithm
24 task queue region in clustering algorithm
25 enqueue determination unit in gridding algorithm
26 task queue region in gridding algorithm
27 enqueue determination unit in grouping algorithm
28 task queue region in grouping algorithm
30 coordinate-format data
31 cluster data
32 section on lattice map with which cluster data is associated
33 group information

The invention claimed is:

1. An object recognition device comprising:
a processor, wherein the processor
receives point cloud sensor data from a sensor that senses the point cloud sensor data,
inputs the point cloud sensor data to a software pipeline formed of a plurality of stages,
executes object recognition processing based on the point cloud sensor data in the software pipeline, and
has a plurality of processing units that executes respective object recognition processing of each of the stages producing corresponding output data of each of the stages; and
a memory having a plurality of task queue regions that temporarily stores the corresponding output data of each of the stages, wherein in a case when the corresponding output data of each of the stages is not valid upon input to the subsequent stage, the processor rejects the corresponding output data without storing the corresponding output data in a respective task queue region.

2. The object recognition device according to claim 1, wherein:
the processor comprises a plurality of enqueue units, and
in the case when the corresponding output data of each of the stages is not valid upon input to the subsequent stage, each enqueue unit rejects the corresponding output data without storing the corresponding output data in the respective task queue region.

3. The object recognition device according to claim 2, wherein the object recognition device is mounted on a vehicle and the sensor is a LiDAR sensor.

4. The object recognition device according to claim 2, wherein each of the enqueue units stores the corresponding output data in the respective task queue regions only in a case when the corresponding output data of each of the stages is valid upon input to the subsequent stage.

5. The object recognition device according to claim 2, wherein:
in a case when observation values cannot be acquired, the sensor includes, in the sensor data, information indicating that the sensor data is invalid, and outputs the sensor data,
in a case when the information indicating that the sensor data is invalid is included in the sensor data, the processing unit of a first stage includes, in the corresponding output data, information indicating that the sensor data is invalid, and outputs the corresponding output data, and
in a case when the information indicating that the sensor data is invalid is included in the output data, the corresponding output data of the first stage is not valid upon input to the subsequent stage.

6. The object recognition device according to claim 5, wherein, in a case when the corresponding output data of the first stage is not valid upon input to the subsequent stage, the enqueue unit of the first stage does not store the corresponding output data in the respective task queue region of the first stage.

7. The object recognition device according to claim 2, wherein, in a case when the corresponding output data of the respective stage is within a range of a three-dimensional space which the sensor is capable of sensing, the corresponding output data of the stage is valid upon input to the subsequent stage.

8. The object recognition device according to claim 2, wherein a second and subsequent output data that is a duplicate among the corresponding output data of the respective stage is not valid.

9. The object recognition device according to claim 1, wherein priorities of the task queue regions are based on a number of pieces of the unprocessed output data stored in the task queue regions of each of the stages.

10. The object recognition device according to claim 9, wherein the priorities of the task queue regions are based on a number of pieces of unprocessed output data stored in the task queue regions of each of the stages.

11. The object recognition device according to claim 10, wherein the plurality of processing units executes the processing of the subsequent stage that processes the output data stored in a highest priority task queue region.

12. The object recognition device according to claim 11, wherein the processor executes the object recognition processing by using the software pipeline for each piece of sensor data corresponding to a predetermined range of azimuth angles sensed by the sensor.

13. The object recognition device according to claim 1, wherein the object recognition processing includes at least one of:
writing coordinate format data to a task queue region when the coordinate format data is contained in a predetermined space and has a reliability equal to or greater than a fixed value;
writing cluster data to the task queue region when the cluster data is contained in the predetermined space and a number of constituent points of a cluster to which the cluster data belongs is equal to or more than a fixed value;
writing index information to the task queue region when a section of a XY plane associated with the cluster data is within a fixed time interval; and
updating group information based on the index information in at least one of the task queue regions and a label value.

14. The object recognition device according to claim 1, wherein:
a plurality of software pipelines is provided,
the sensor data corresponding to a predetermined range of azimuth angles sensed by the sensor is input to each of the software pipelines, and
the processor executes the object recognition processing using the plurality of software pipelines.

15. The object recognition device according to claim 1, wherein each processing unit executes processing according to a respective partial recognition algorithm that constitutes the object recognition processing of each of the stages.

\* \* \* \* \*